United States Patent
Nagumo (12) United States Patent (10) Patent No.: US 6,318,861 B1
(45) Date of Patent: Nov. 20, 2001

(54) FILM POSITIONING SYSTEM AND METHOD THEREOF

(75) Inventor: Hirobumi Nagumo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/328,759

(22) Filed: Jun. 9, 1999

(30) Foreign Application Priority Data

Jun. 9, 1998 (JP) ................................ 10-161115

(51) Int. Cl.$^7$ ................. G03B 1/00; G03B 1/24
(52) U.S. Cl. ............ 352/166; 352/184; 352/187
(58) Field of Search ................. 352/166, 174, 352/184, 186, 187, 188, 189, 190; 396/440, 387–418

(56) References Cited

U.S. PATENT DOCUMENTS

| | | | |
|---|---|---|---|
| 3,408,144 | * 10/1968 | Cowan, Jr. ............... | 355/48 |
| 3,984,849 | * 10/1976 | Guillaume ............... | 396/305 |
| 4,150,886 | * 4/1979 | Merkel et al. ............ | 352/166 |
| 4,253,749 | * 3/1981 | Boudouris ................ | 352/187 |
| 4,537,482 | * 8/1985 | Weiner .................... | 352/186 |
| 4,863,262 | * 9/1989 | Berggren et al. .......... | 352/187 |
| 5,023,640 | * 6/1991 | Diehl ...................... | 396/398 |
| 5,175,573 | * 12/1992 | Blaschek et al. .......... | 352/180 |
| 5,266,979 | * 11/1993 | Brown et al. ............. | 352/224 |
| 5,474,245 | 12/1995 | Gunday et al. . | |
| 5,596,384 | * 1/1997 | Tanaka et al. ............ | 396/413 |
| 5,861,911 | * 1/1999 | Oosaka et al. ............ | 348/96 |
| 5,886,772 | * 3/1999 | Inatome et al. ........... | 352/225 |
| 6,019,473 | * 2/2000 | Goodhill et al. .......... | 352/180 |
| 6,142,632 | * 11/2000 | Inatome .................. | 352/166 |

FOREIGN PATENT DOCUMENTS 08340481 12/1996 (JP) .

* cited by examiner

Primary Examiner—Russell Adams
Assistant Examiner—Rodney Fuller
(74) Attorney, Agent, or Firm—Crosby, Heafey, Roach & May (57) ABSTRACT

In a film positioning system and method thereof, stable film positioning is accomplished. In the present invention, when a film is fed to a stop position by driving first feeding mechanism and second feeding mechanism synchronizing with each other and then the stop position is determined with the first feeding mechanism or the second feeding mechanism, a fixed tension is applied to the film by the other feeding mechanism.

15 Claims, 8 Drawing Sheets

11 INTERMITTENT FILM FEEDER PART

FIG. 8

FILM POSITIONING SYSTEM AND METHOD THEREOF

BACKGROUND OF THE INVENTION

1. Field of the Invention

The present invention relates to a film positioning system and a method thereof, and more particularly, is suitably applied to a telecine device which converts images recorded on a cinefilm into a video signal, for example.

2. Description of the Related Art

In a telecine device, one frame of images recorded on a cinefilm is positioned on the optical axis of a video camera, and a source light is entered into the pickup system of the video camera through the cinefilm in this state. Thereby, the above positioned frame image is picked up by the video camera.

Moreover, after completing the pickup of the one frame image in this manner, the telecine device feeds the cinefilm and positions the next frame on the optical axis, and performs a similar pickup in this state, so that the images sequentially recorded on the cinefilm are converted into video signals (hereinafter, it is referred to as telecine processing).

In such a telecine device, an intermittent film feeder is provided to intermittently feed a cinefilm frame by frame. In the intermittent film feeders, there are two kinds of intermittent feeding systems, by mechanical control in that the gear teeth of sprockets are engaged with perforations provided on the both ends of the cinefilm in its width direction (sprocket holes on the film) and the above sprockets are intermittently rotated through, e.g., Geneva gears, so that a cinefilm is intermittently fed, and by electronic control in that a motor itself for rotating sprockets is intermittently and rotationally driven, so that a cinefilm is intermittently fed.

In the intermittent feeding system by mechanical control, when the machine is finely regulated, positioning accuracy of a cinefilm becomes fine by being used with a registration pin, so that image pause performance is improved.

By the way, with respect to a feed length per frame in cinefilms, for instance, a feed length corresponding to four perforations is a standard format in a 35 mm film. Other than that, there is a format for high quality mode in which a feed length per frame corresponds to eight perforations, a format for reducing the running cost of a film in which a feed length corresponds to three perforations per frame, etc. Furthermore, recently, various film formats such as a film format of two half perforations per frame, and a film format considering a combinability with a 16 mm film, exist. Therefore, an intermittent film feeder which can easily adapt to these formats and is economical is desired.

However, in the above intermittent film feeder in the intermittent feed system by mechanical control, since its intermittent feed operation is mechanical, it is difficult to adapt to various film formats. Moreover, in some cinefilms, perforation pitch changes as the film itself changes over the years. Since the intermittent film feeder by mechanical control basically adapts to only perforations at a prescribed pitch, if a cinefilm with changed perforation pitch is intermittently fed, there is a possibility of damaging the film itself.

Figure 1:
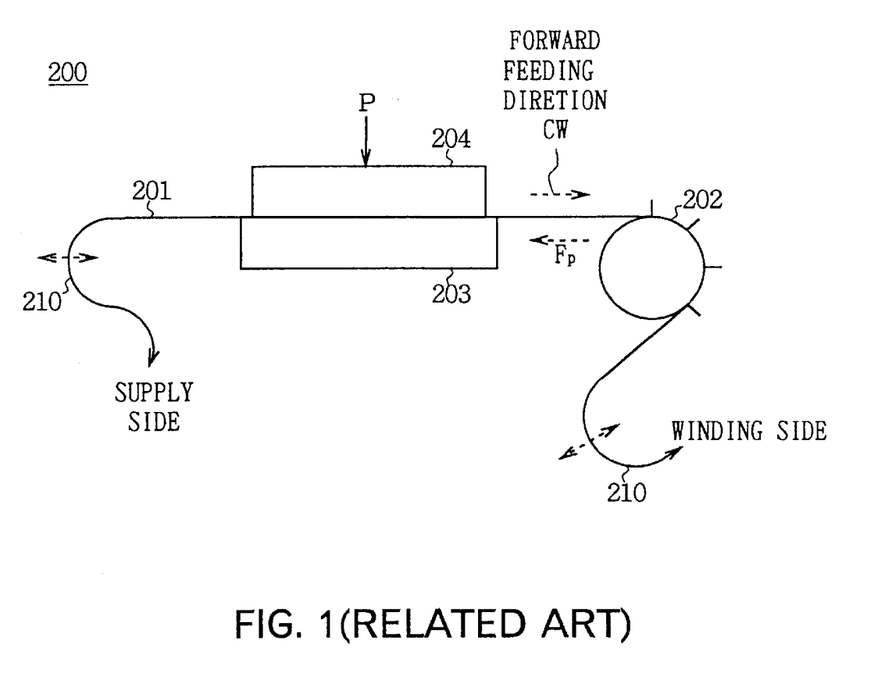
FIG. 1 is a block diagram showing the configuration of a conventional intermittent film feeder by electronic control.

On the other hand, in an intermittent film feeder 200 by the intermittent feeding system by electronical control, as shown in FIG. 1, one intermittent feed sprocket 202 is provided to intermittently feed a cinefilm 201 which is supplied from a supply reel (not shown in FIG. 1) on a supply side to a winding reel (not shown) on a winding side.

Furthermore, the intermittent film feeder 200 guides the above cinefilm 201 while regulating a feed position of the cinefilm 201 by a film gate 203 at a position on the axis of a video camera (not shown).

The intermittent film feeder 200 has one continuous feed sprocket (not shown) on the supply side and the winding side of the cinefilm 201 respectively. In the state where a flection 210 is generated between the continuous feed sprocket on the supply side and the film gate 203, and between the continuous feed sprocket on the winding side and the intermittent feed sprocket 202, respectively, the cinefilm 201 is intermittently fed by being pressed to the film gate 203 under a prescribed pressure with a skate press 204 while rotationally driving the intermittent feed sprocket 202.

This intermittent feed sprocket 202 is rotationally driven by a DC servomotor (not shown), and the above cinefilm 201 is intermittently fed in the state where the gear teeth are engaged with perforations provided at the both ends of the cinefilm 201 in the width direction. A certain gap is provided in the forward direction of the above perforations so that the gear teeth of the intermittent feed sprocket 202 are smoothly engaged with and disengaged from the perforations of the cinefilm 201 at this time.

Furthermore, the intermittent feed sprocket 202 starts and stops so as to position the cinefilm 201 for each frame by electronical control such as a drive motor or a cam. That is, the intermittent feed sprocket 202 is rotationally driven so as to position the gear teeth pulling the cinefilm 201 to a fixed angle, and the rigidity of the gear teeth is set sufficiently large comparing the film load of the cinefilm 201.

The skate press 204 is a pressing mechanism to generate a friction $F_p$ for positioning the frames of the cinefilm 201 stably. For instance, a pressure of 15N degrees is applied to the 35 mm cinefilm 201, so that a friction $F_p$ of 4.5N degrees is generated in a direction reverse to the forward feeding direction CW. If the friction $F_p$ by this skate press 204 is not generated, the feed operation itself for the cinefilm 201 by the intermittent feed sprocket 202 can be performed, however, when the intermittent feed sprocket 202 is stopped, a stable positioning operation cannot be executed because overrun occurs in which a film does not stop at a stop position, owing to the inertia force of the cinefilm 201.

Moreover, in recent years, the intermittent feeding operation for the cinefilm 201 can be performed at a high speed of 48 frame/sec or more. In such a case, a larger friction $F_p$ by the skate press 204 is required on the execution of stable positioning of the cinefilm 201.

In such a telecine device, when the cinefilm 201 is intermittently fed frame by frame by the intermittent film feeder 200, the friction $F_p$ by the skate press 204 is applied to the both ends (edge parts) of the cinefilm 201. Recently, however, since control data such as a digital audio signal and a time code is recorded in these parts, there has been a problem that the friction $F_p$ by the skate press 204 damages the digital audio signal and the control data or the like.

Furthermore, in a telecine device, when the cinefilm 201 is intermittently fed frame by frame by the intermittent film feeder 200, if the friction $F_p$ to be applied was not adjusted according to the differences of the above cinefilm 201 in its kind or being new or old or the like, it is difficult to execute a stable positioning. Even if that can be adjusted, there has been a problem that stable positioning operation cannot be performed since a friction $F_p$ to be applied to the film changes as the film condition changes with the cinefilm 201 run.

SUMMARY OF THE INVENTION

In view of the foregoing, an object of this invention is to provide a film positioning system and a method thereof that can stably execute a film positioning with a simple configuration.

The foregoing object and other objects of the invention have been achieved by the provision of a film positioning system and a method thereof. In the case where a film is fed in its longitudinal direction and then stopped at a predetermined position, the above film is pulled in a film feeding direction by a prescribed distance by the first feeding means engaged with the film on a supplied side, and the film is sent out in the feeding direction by the prescribed distance by the second feeding means engaged with the film on a supplying side against the film feeding direction synchronizing with the first feeding means, so that the film is fed to the stop position. When the film is stopped at the stop position, the film is held at the stop position by the first feeding means or the second feeding means. When the film is held at the stop position by one feeding means, a fixed tension is applied to the film by the other feeding means.

When the film is sent to the stop position by synchronously driving the first feeding means and the second feeding means and then the stop position is determined by the first feeding means or the second feeding means, the fixed tension is applied to the film by the other feeding means. Thereby, the fixed tension can be applied to the film in film positioning, so that the film can be accurately positioned at the stop position.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:
(1) General Configuration of Telecine Device Referring to FIG. 2, 1 generally shows a telecine device. A cinefilm 4 sent from a supply reel 3 that is rotationally driven by a reel motor 2 is sent to an intermittent film feeder part 11 via a guide roller 5, the roller 7 of a tension arm 6 and guide rollers 8 to 10. Here, the tension arm 6 applies a prescribed tension to the cinefilm 4 via the guide roller 5, the roller 7 and the guide roller 8, so that the above cinefilm 4 can be sent to the intermittent film feeder part 11 smoothly.

Figure 2:
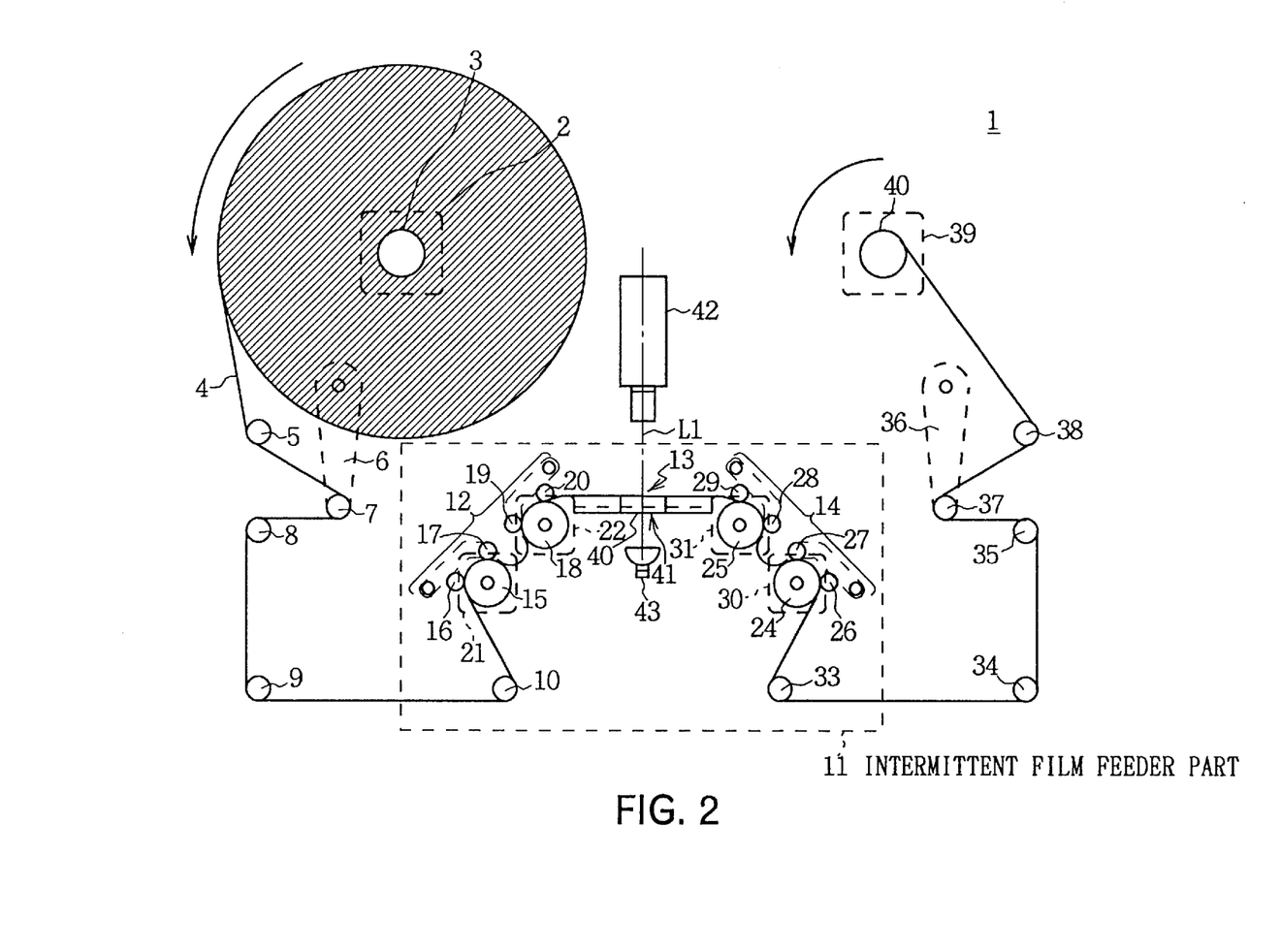
FIG. 2 is a block diagram showing the general configuration of a telecine device of an embodiment of the present invention.

The intermittent film feeder part 11 is composed of a film regulating part 12 on a film supplying side, a film gate part 13, and a film regulating part 14 on a film winding side. The film regulating part 12 has a continuous feed sprocket 15 and an intermittent feed sprocket 18. The cinefilm 4 is regulated by being pinched with pad rollers 16 and 17 and the continuous feed sprocket 15 so that the cinefilm 4 is prevented from detaching from the continuous feed sprocket 15. At the same time, the cinefilm 4 is regulated by being pinched with pad rollers 19 and 20 and the intermittent feed sprocket 18 so that the cinefilm 4 is prevented from detaching from the intermittent feed sprocket 18.

Furthermore, the film regulating part 12 rotationally drives the continuous feed sprocket 15 continuously by a continuous feed motor 21, and at the same time, intermittently and rotationally drives the intermittent feed sprocket 18 by an intermittent feed motor 22 by each prescribed angle, to generate a flexion between the continuous feed sprocket 15 and the intermittent feed sprocket 18. Thereby, the cinefilm 4 can be intermittently fed to a film gate part 13.

On the other hand, also the film regulating part 14 on the film winding side has a continuous feed sprocket 24 and an intermittent feed sprocket 25 similarly to the film regulating part 12. The film regulating part 14 regulates the cinefilm 4 by pinching with pad rollers 26 and 27 and the continuous feed sprocket 24 so that the cinefilm 4 is prevented from detaching from the continuous feed sprocket 24, and at the same time, regulates the cinefilm 4 by pinching with pad rollers 28 and 29 and the intermittent feed sprocket 25 so that the cinefilm 4 is prevented from detaching from the intermittent feed sprocket 25.

Also the film regulating part 14, similarly to the film regulating part 12, continuously rotationally drives the continuous feed sprocket 24 by a continuous feed motor 30, and at the same time, intermittently and rotationally drives the intermittent feed sprocket 25 by an intermittent feed motor 31 by each prescribed angle, and generating a flexion between the continuous feed sprocket 24 and the intermittent feed sprocket 25.

Thereby, each gear tooth of the intermittent feed sprocket 18 and of the intermittent feed sprocket 25 is engaged with a perforation drawn to one side. Thus, the cinefilm 4 intermittently fed by the film regulating part 12 and the film regulating part 14 is intermittently fed to the film gate part 13 frame by frame unitedly with the rotation of the intermittent feed sprocket 18 and the intermittent feed sprocket 25 without shaking.

Then, the cinefilm 4 is wound on a winding reel 40 that is rotationally driven by a reel motor 39 via guide rollers 33 to 35, the roller 37 of a tension arm 36 and a guide roller 38. Also here, the tension arm 36 applies a prescribed tension to the cinefilm 4 via the guide roller 35, the roller 37 and the guide roller 38. Thereby, the above cinefilm 4 can be sent to the winding reel 40 smoothly. As a result, the cinefilm 4 can be wound without slackening.

The film gate part 13 irradiates a source light from a light source 43 provided under the gate 41 in the state where a frame of the cinefilm 4 is positioned at a specified position on the optical axis of a CCD camera 42 provided at a position opposite to the gate 41. A transmission light passing through the frame of the cinefilm 4 is picked up on the image pickup screen of the CCD camera 42. The CCD camera 42 applies photo-electric conversion on the transmission light passing through the frame of the cinefilm 4, and converts it into a video signal, and outputs this.

In the film gate part 13, if photographing of one frame is finished in this manner, the next frame is intermittently fed to the prescribed position on the optical axis of the CCD camera 42 by the intermittent feed sprockets 18 and 25 and is positioned.

(2) Circuitry of Intermittent Film Feeder Part

Figure 3:
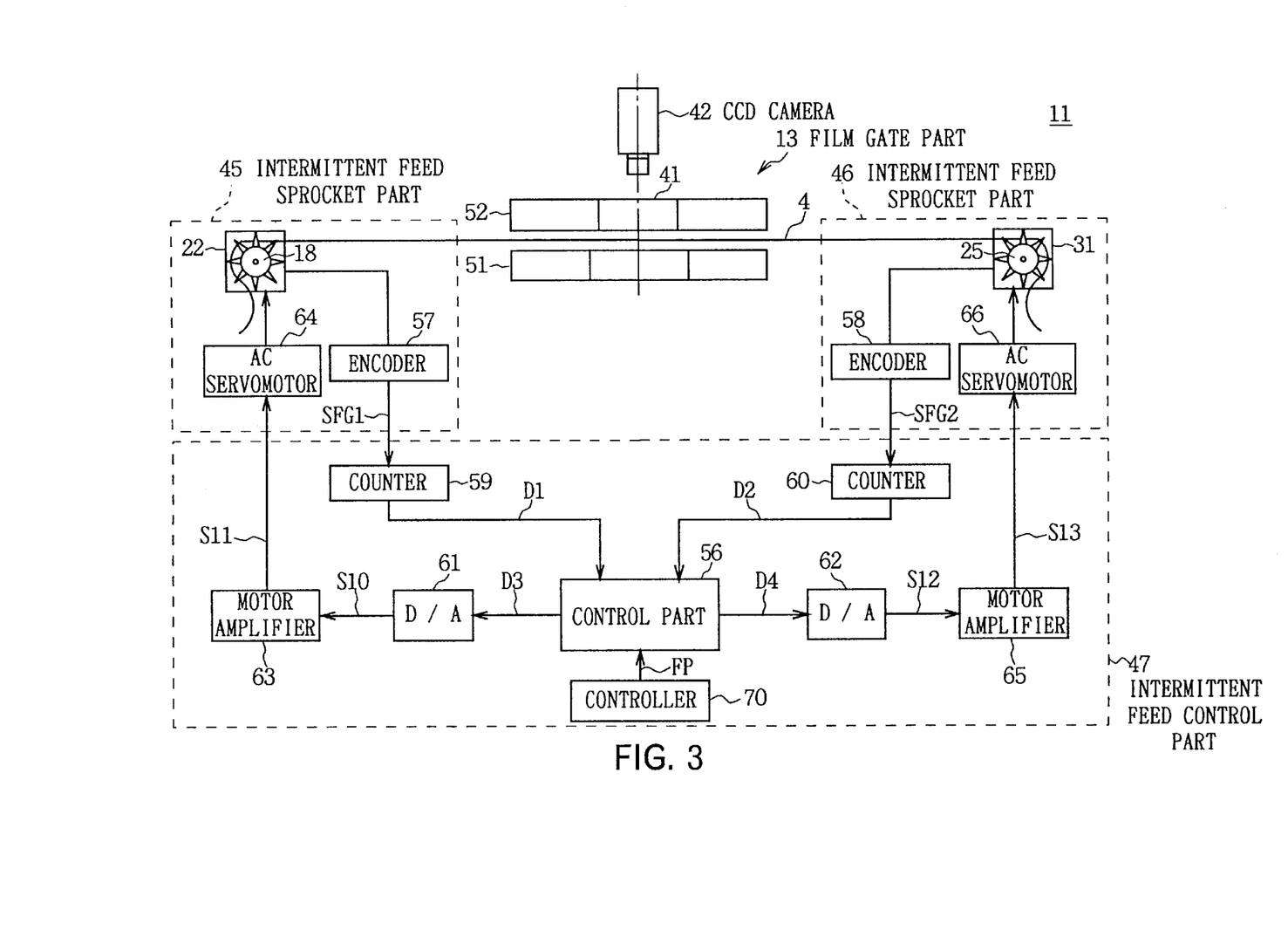
FIG. 3 is a block diagram showing the configuration of an intermittent film feeder part.

As shown in FIG. 3, the intermittent film feeder part 11 detects the stop position of a frame of the cinefilm 4 intermittently fed by the intermittent feed sprocket parts 45 and 46 by a film gate part 13, and supplies motor torque signals S11 and S13 which are used in order that an intermittent feed control part 47 positions the frame to a prescribed stop position based on the above detected result to the intermittent feed sprocket parts 45 and 46. Thereby, intermittent rotational operation is controlled.

The film gate part 13 is composed of a fixed side picture gate 51 and a movable side picture gate 52. The frame of the cinefilm 4 intermittently fed between the fixed side picture gate 51 and the movable side picture gate 52 by the intermittent rotational operation of the intermittent feed sprockets 18 and 25, is positioned at a position opposite to a gate 41 and a position on the optical axis of the CCD camera 42.

In the movable side picture gate 52, the gate 41 which is of a size slightly larger than one frame of the cinefilm 4 is formed at the almost center, and a through-hole which is formed in a size larger than the gate 41 is provided at the almost center of the fixed side picture gate 51 opposite to the above gate 41. A source light entered through the above through-hole passes through the frame of the cinefilm 4. This transmission light passes the gate 41 and enters into the image pickup surface of the CCD camera 42.

Furthermore, the movable side picture gate 52 presses the cinefilm 4 by a prescribed pressure against the fixed side picture gate 51, so that it is pinched between the movable side picture gate 52 and the fixed side picture gate 51. The amount of this pressure is such that the cinefilm 4 can smoothly and intermittently run between the movable side picture gate 52 and the fixed side picture gate 51.

The intermittent feed sprockets 18 and 25 transmit frequency signals SFG1 and SFG2 which correspond to the rotation speed of the intermittent feed sprockets 18 and 25 to counters 59 and 60 by encoders 57 and 58 attached to the rotary shafts of the intermittent feed motors 22 and 31. The counters 59 and 60 transmit count value data D1 and D2 obtained by counting the number of pulses based on the frequency signals SFG1 and SFG2 to the control part 56.

The control part 56 obtains the present rotation angle (i.e., rotational position) of the intermittent feed sprockets 18 and 25 as the count value data D1 and D2. Then, the control part 56 generates intermittent drive pulse data D3 and D4 used to intermittently feed the cinefilm 4 for one frame from the present rotational position and position it based on a frame pulse FP used to perform telecine processing of the next one frame supplied from a controller 70, respectively, and transmits them to digital-to-analog converters 61 and 62.

In this case, the intermittent feed control part 47 rotationally drives the intermittent feed sprockets 18 and 25 simultaneously according to the intermittent drive pulse data D3 and D4 respectively, so that the cinefilm 4 is intermittently fed unitedly with the rotational operation of above intermittent feed sprockets 18 and 25. Thereby, the control part 56 performs a stable intermittent feeding without giving the cinefilm 4 a sudden tension generated when either the intermittent feed sprocket 18 or 25 has not rotated.

At this time, the intermittent feed control part 47 uses the intermittent feed sprocket 25 only for position control for the intermittent feeding operation of the cinefilm 4, and uses the intermittent feed sprocket 18 for position control and tension control. Thereby, even if the perforation pitch of the cinefilm 4 is lengthened or shortened for each frame, intermittent feeding can be performed in the state where an always fixed tension is applied to the cinefilm 4. Thus, each frame of the cinefilm 4 can be accurately positioned to a prescribed stop position.

That is, the intermittent feed sprocket 25 rotationally drives the cinefilm 4 by a prescribed rotation angle in the winding direction, so that the cinefilm 4 is moved for one frame and then stopped at the position. The intermittent feed sprocket 18 rotationally drives by the prescribed rotation angle similar to the intermittent feed sprocket 25, so that the cinefilm 4 is moved for approximately one frame and then such a fixed torque as to rotate the intermittent feed sprocket 18 in the reverse direction is applied. Thus, a fixed tension is applied to the cinefilm 4.

A digital-to-analog converter 62 converts the intermittent drive pulse data D4 used for position control into an analog motor torque signal S12, and transmits this to a motor amplifier 65. The motor amplifier 65 amplifies the motor torque signal S12 into a specified level, and transmits this to the AC servomotor 66 of the intermittent feed sprocket part 46 as a motor torque signal S13.

The AC servomotor 66 rotationally drives an intermittent feed motor 31 to a rotation angle based on the motor torque signal S13, and intermittently rotates the intermittent feed sprocket 25 simultaneously which is connected to the above intermittent feed motor 31.

At this time, the digital-to-analog converter 61 simultaneously converts the intermittent drive pulse data D3 used to perform tension control after position control into an analog motor torque signal S10, and transmits this to a motor amplifier 63. The motor amplifier 63 amplifies the motor torque signal S10 into a specified level, and transmits this to the AC servomotor 64 of the intermittent feed sprocket part 45 as a motor torque signal S11.

The AC servomotor 64 rotationally drives the intermittent feed motor 22 to a rotation angle based on the motor torque signal S11 and intermittently rotates the intermittent feed sprocket 18 simultaneously which is connected to the above intermittent feed motor 22, and then applies a fixed torque so as to rotate the intermittent feed sprocket 18 in the reverse direction.

That is, the intermittent film feeder part 11 simultaneously outputs the intermittent drive pulse data D3 and D4 from the control part 56 and intermittently rotates both the intermittent feed sprockets 18 and 25, and applies the fixed torque to rotate only the intermittent feed sprocket 18 in the reverse direction after the cinefilm 4 is moved for one frame. Thereby, a frame is intermittently fed without damaging the cinefilm 4, and then it can be accurately positioned to a specified position.

An actual method for intermittent feed control in the intermittent film feeder part 11 is described by separating into two parts: the intermittent feed sprocket 25 which performs only position control, and the intermittent feed sprocket 18 which performs tension control after position control.

Figure 4:
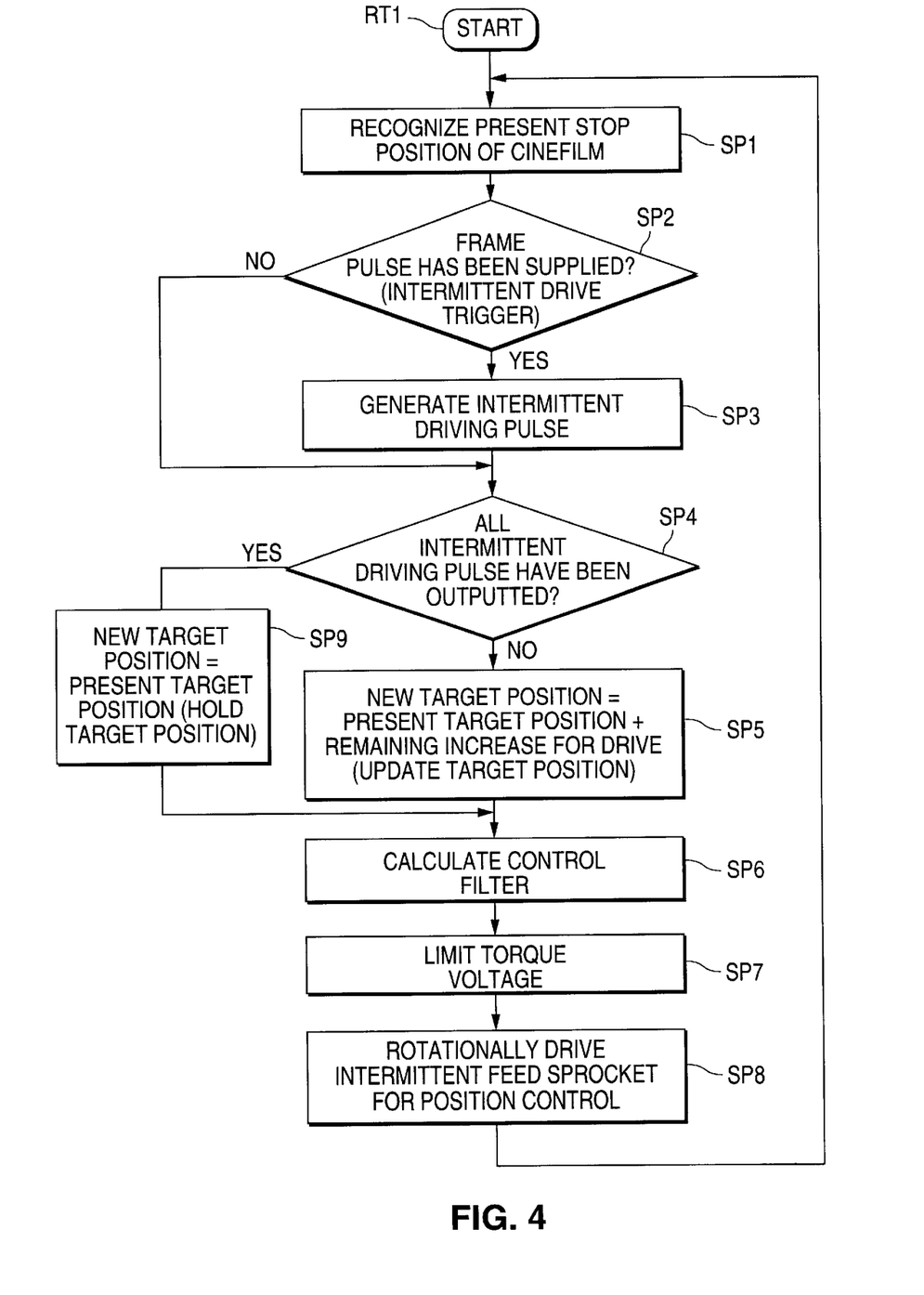
FIG. 4 is a flow chart showing the processing procedure of an intermittent feed sprocket for position control.

The processing procedure of the intermittent film feeder part 11 when the cinefilm 4 is intermittently fed and positioned by the intermittent feed sprocket 25 only for position control is described accompanying with the flow chart of FIG. 4.

Specifically, the intermittent film feeder part 11 enters the processing from a start step RT1 and proceeds to step SP1. In step SP1, the control part 56 counts the frequency signal SFG2 from the encoder 58 by the counter 60 and recognizes the present stop position of the intermittent feed sprocket 25, and then proceeds to the following step SP2.

In step SP2, the control part 56 determines whether or not a frame pulse FP has been supplied as an intermittent drive trigger from the controller 70. Here, if an affirmative result is obtained, this means that the frame pulse FP has been supplied from the controller 70, and then the control part 56 proceeds to the following step SP3.

In step SP3, the control part 56 generates the intermittent drive pulse data D4 used to move the cinefilm 4 for one frame based on the rising edge of the frame pulse FP supplied from the controller 70.

Here, for instance, if nine pulses are required for the intermittent drive pulse data D4 to intermittently feed the cinefilm 4 by one frame, the control part 56 outpus the nine pulses of the intermittent drive pulse data D4 by stages. Specifically, in the case where the first target position to move the cinefilm 4 by one frame is set to pulse 0, the second target position is set to the first pulse obtained by that the increase by addition of one pulse is added to the above pulse 0, the third target position is set to the third pulse obtained by that the increase by addition of two pulses are added to the above pulse 1, and the fourth target position is set to the sixth pulse obtained by that the increase by addition of three pulses are added to the above pulse 3, and after that, the intermittent drive pulse data D4 is outputted by setting a target position stepwise so that the ninth pulse is to be the final target position by accummulately adding the increase by addition in the order of pulse 2, pulse 1.

In this manner, the control part 56 outputs all of the intermittent drive pulse data D4 for nine pulses stepwise, so that one frame of the cinefilm 4 is intermittently fed smoothly.

Figure 5:
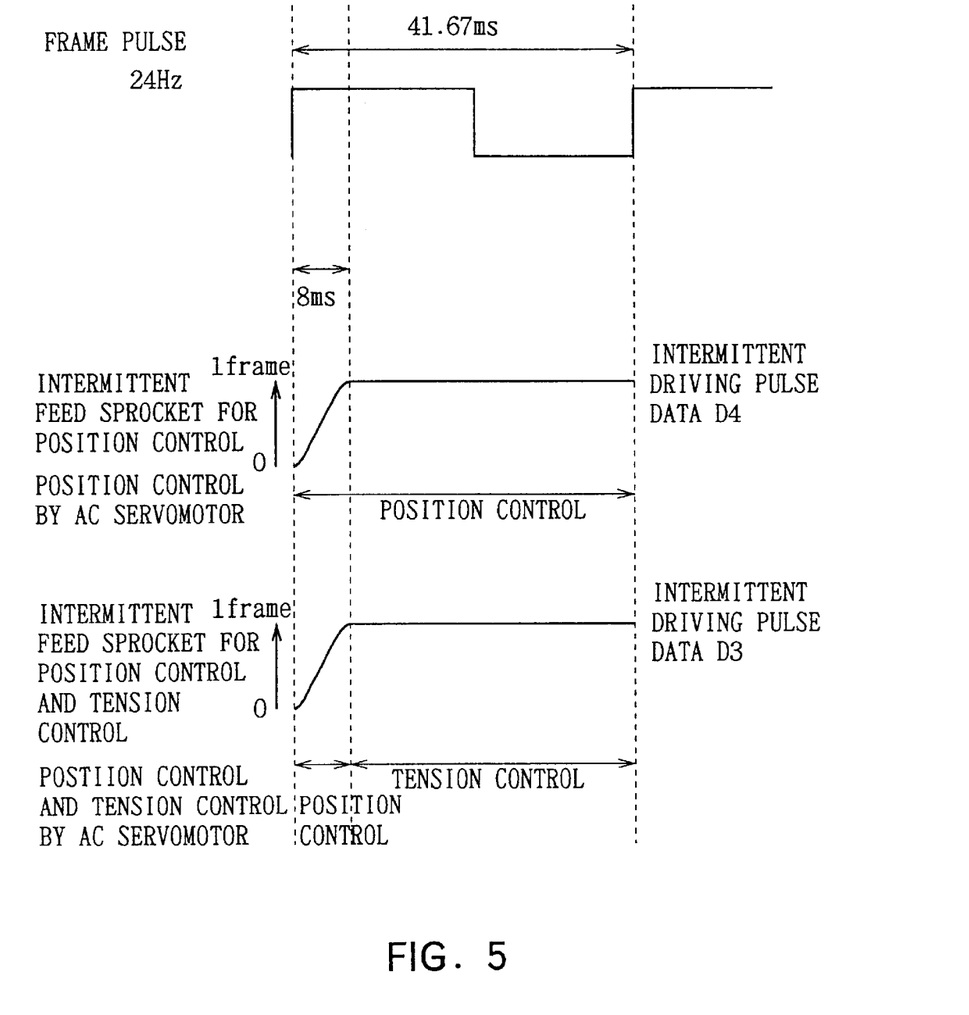
FIG. 5 is a waveform diagram showing a timing chart in intermittent drive.

Practically, as shown in FIG. 5, the frame pulse FP is supplied from the controller 70 to the control part 56 in a cycle of 41.67 ms that is required for intermittently rotating one frame of the cinefilm 4 and positioning it to a prescribed position and then performing telecine processing. One frame of the cinefilm 4 is sent for 8 ms in the above cycle 41.67 ms. Accordingly, the control part 56 outputs the intermittent drive pulse data D4 for nine pulses for 8 ms and moving one frame, and then stops the cinefilm 4 at the position and performs position control.

In step SP4, the control part 56 determines whether or not all of the nine pulses of the intermittent drive pulse data D4 have been outputted. Here, if a negative result is obtained, this means that all of the nine pulses of the intermittent drive pulse data D4 have not been outputted yet. At this time, the control part 56 proceeds to the following step SP5.

In step SP5, the value which is obtained by adding the stepwise-added increase remaining in the nine pulses of the intermittent drive pulse data D4 to the present target position is updated as a new target position by the control part 56, and then it proceeds to the following step SP6.

Figure 6:
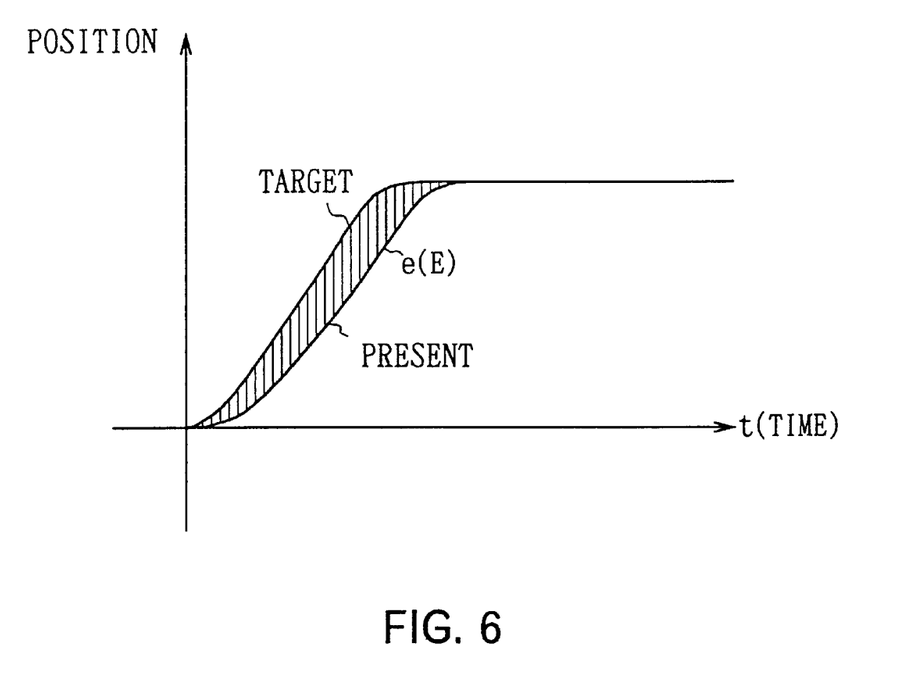
FIG. 6 is a characteristic curvilinear diagram showing an error between a target position and the present position.

In step SP6, as shown in FIG. 6, the control part 56 represents the intermittent drive pulse data D4 increased by addition using a difference between a target position represented by the intermittent drive pulse data D4 and the present position of the intermittent feed sprocket 25, after it has actually moved as error data "e" representing an error that the intermittent feed sprocket 25 cannot follow the intermittent drive pulse data D4, by the following expression (1):

$$D4 = (K_1 \times e) + \left(K_2 \times \frac{d}{dt}(e)\right) + \left(K_3 \times \int (e)\right) \quad (1)$$

($K_1$, $K_2$ and $K_3$ are arbitrary constants)

Here, in the intermittent drive pulse data D4 represented by the above Expression (1), its followup ability can be improved by setting a constant value $K_2$ larger because it increases a small error obtained by a differentiation by several times. Furthermore, its followup ability can be slowed by setting a constant value $K_3$ larger. In this manner, the control part 56 adjusts the responsiveness of the actual intermittent feeding operation of the intermittent feed sprocket 25 to a target position.

In step SP7, the control part 56 limits the value of the intermittent drive pulse data D4 to be supplied to intermittently feed one frame of the cinefilm 4, so that the intermittent drive pulse data D4 is outputted to a digital-to-analog converter 62 without applying more load than needed to an AC servomotor 66.

In step SP8, the control part 56 generates the analog motor torque signal S12 based on the intermittent drive pulse data D4 by the digital-to-analog converter 62 and supplies this to a motor amplifier 65.

The motor amplifier 65 amplifies the motor torque signal S12 into a specified level and transmits this to the AC servomotor 66 as the motor torque signal S13. The AC servomotor 66 rotationally drives the intermittent feed motor 31 to a rotation angle based on the motor torque signal S13 to make the intermittent feed sprocket 25 connected to the above intermittent feed motor 31 rotate every number of pulses increased by addition of the supplied intermittent drive pulse data D4, and then returns to the aforementioned step SP1 to repeat processing thereafter.

In step SP2, since the first frame pulse FP has been supplied but the next frame pulse FP has not been supplied yet, the control part 56 obtains a negative result and proceeds to step SP4. In step SP4, the control part 56 obtains an affirmative result when the output of all of the intermittent drive pulse data D4 for nine pulses has been finished, and proceeds to step SP9 at this time.

In step SP9, the control part 56 repeats the processing after the following step SP6 while holding the present position of the intermittent feed sprocket 25 as a new target position. Here, since there is a case where the rotation angle of the intermittent feed sprocket 25 actually does not reach the new target position, the processing after step SP6 is repeated again. In this manner, the intermittent film feeder part 11 intermittently feeds the cinefilm 4 frame by frame using the intermittent feed sprocket 25 for position control.

Figure 7:
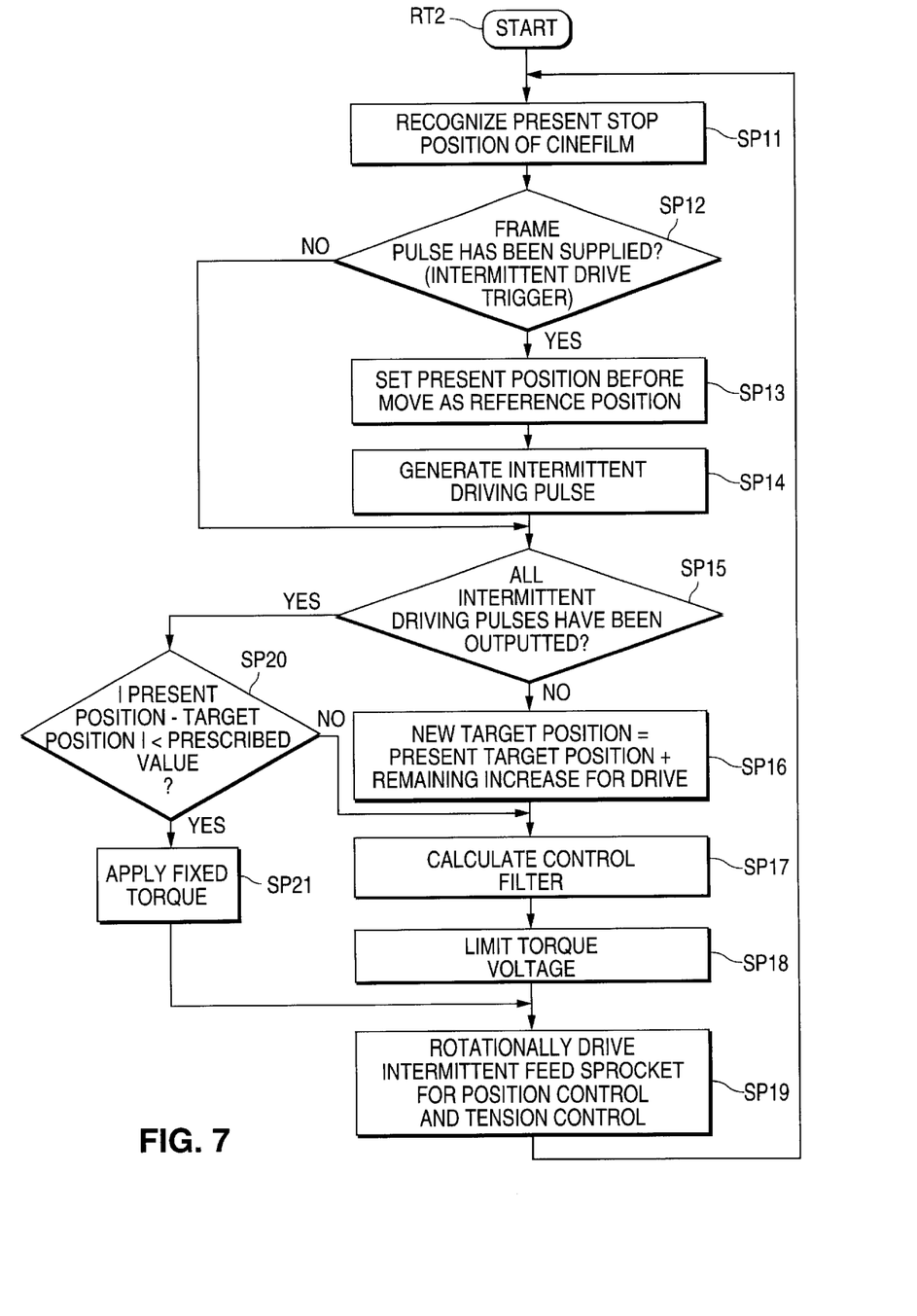
FIG. 7 is a flow chart showing the processing procedure of an intermittent feed sprocket for position control and tension control.

The processing procedure when the intermittent film feeder part 11 intermittently feeds the cinefilm 4 and positions by the intermittent feed sprocket 18 for both position control and tension control, will now be explained in conjunction with the accompanying chart of FIG. 7.

The intermittent film feeder part 11 enters the processing from a start step RT2 and proceeds to step SP11. In step SP11, the control part 56 counts the frequency signal SFG1 from the encoder 57 by the counter 59 and recognizes the present stop position of the intermittent feed sprocket 18, and proceeds to the following step SP12.

In step SP12, the control part 56 determines whether or not a frame pulse FP has been supplied from the controller 70 as an intermittent drive trigger.

If an affirmative result is obtained here, this means that a frame pulse FP has been supplied from the controller 70 as the intermittent drive trigger. At this time, the control part 56 proceeds to the following step SP13.

In step SP13, the control part 56 sets the present stop position of the intermittent feed sprocket 18 before moving as a reference position at the time of intermittent feeding, and proceeds to the following step SP14. In the intermittent feed sprocket 18, sometimes a shift from the position moved by one frame is generated because it is returned in the reverse direction from the original stop position of the frame of the cinefilm 4 to perform tension control after position control. Therefore, the control part 56 sets the present stop position of the intermittent feed sprocket 18 before moving as a reference position at the time of intermittent feeding, and intermittently feeds the cinefilm 4 by one frame based on the above-referenced position.

In step SP14, the control part 56 generates the intermittent drive pulse data D3 used to move the cinefilm 4 by one frame based on the rising edge of the frame pulse FP. Also in this case, it is assumed that feeding intermittently the cinefilm 4 for one frame requires nine pulses of the intermittent drive pulse data D3, and the control part 56 outputs nine pulses of the intermittent drive pulse data D3 stepwise similar to the intermittent drive pulse data D4.

In step SP15, the control part 56 determines whether or not all of the intermittent drive pulse data D3 for nine pulses has been outputted. Here, if a negative result is obtained, this means that all of the intermittent drive pulse data D3 for nine pulses have not been outputted yet and that it is on the way of the stage. At this time, the control part 56 proceeds to the following step SP16.

In step SP16, the control part 56 updates the value which is obtained by adding the stepwise-added increase remaining in the intermittent drive pulse data D3 for nine pulses to the present target position as a new target position by the control part 56, and then it proceeds to the following step SP17.

In step SP17, the control part 56 represents the increase by the addition of the intermittent drive pulse data D3 using a difference between the target position represented by the above intermittent drive pulse data D3 and the present position of the intermittent feed sprocket 18 actually moved as error data E. Error data E represents the error by which the intermittent feed sprocket 18 cannot follow the intermittent drive pulse data D3, similar to the intermittent drive pulse data D4 of FIG. 6. D3 is calculated by the following expression (2):

$$D3 = (Q_1 \times E) + \left(Q_2 \times \frac{d}{dt}(E)\right) + \left(Q_3 \times \int (E)\right) \quad (2)$$

($Q_1$, $Q_2$ and $Q_3$ are arbitrary constants)

Here, in the intermittent drive pulse data D3 represented by the above Expression (2), its followup ability can be improved by setting the constant value $Q_2$ larger, because it increases a small error obtained by a differentiation by several times. Furthermore, its followup ability can be slowed by setting the constant value $Q_3$ larger. In this manner, the control part 56 adjusts the responsiveness of the actual intermittent feeding operation of the intermittent feed sprocket 18 to a target position.

In step SP18, the control part 56 limits the value of the intermittent drive pulse data D3 to be supplied to intermittently feed one frame of the cinefilm 4, so that the intermittent drive pulse data D3 is outputted to a digital-to-analog converter 61 without applying more load than needed to the AC servomotor 64.

In step SP19, the control part 56 generates the analog motor torque signal S10 based on the intermittent drive pulse data D3 by the digital-to-analog converter 61 and supplies this to the motor amplifier 63. The motor amplifier 63 amplifies the motor torque signal S10 into a specified level and transmits this to the AC servomotor 64 as the motor torque signal S11.

The AC servomotor 64 rotationally drives the intermittent feed motor 22 to a rotation angle based on the motor torque signal S11 to make the intermittent feed sprocket 18 connected to the above intermittent feed motor 22 intermittently rotate every number of pulses increased by the addition of the supplied intermittent drive pulse data D3, and then returns to the aforementioned step SP11 to repeat processing thereafter.

In step SP12, since the first frame pulse FP has been supplied but the next frame pulse FP has not been supplied yet, the control part 56 obtains a negative result and proceeds to step SP15. In step SP15, the control part 56 obtains an affirmative result when the output of all of the intermittent drive pulse data D3 for nine pulses has finished, and proceeds to step SP20 at this time.

In step SP20, the control part 56 determines whether or not the absolute value of the difference between the present stop position and the target position of the intermittent feed sprocket 18 is lower than the prescribed value. Here, if a negative result is obtained, this means that the absolute value of the difference between the present stop position and the target position of the intermittent feed sprocket 18 exceeds the prescribed value. That is, it is considered that the responsiveness of the intermittent feed sprocket 18 to the intermittent drive pulse data D3 is bad, so that the intermittent feeding of one frame of the intermittent drive pulse data D3 that corresponds to nine pulses has not been accurately executed yet, and much error data E is included in the intermittent drive pulse data D3. Therefore, the control part 56 repeats the processing beginning with step SP17.

On the other hand, if an affirmative result is obtained in step SP20, this means that the absolute value of the difference between the present stop position and the target position of the intermittent feed sprocket 18 is the prescribed value or lower. At this time, the control part 56 recognizes that intermittent feeding operation of one frame corresponding to nine pulses of the intermittent drive pulse data D3 has certainly executed within a range approximately allowed, and proceeds to the following step SP21.

In step SP21, the control part 56 actually outputs nine pulses of the intermittent drive pulse data D3 (FIG. 5) for 8 ms and moves the cinefilm 4 by one frame by the intermittent feed sprocket 18. Thereby, the cinefilm 4 is smoothly and intermittently fed to follow the intermittent feed sprocket 25 without applying more tension than needed. Thereafter, the control part 56 applies a fixed torque so as to rotate the cinefilm 4 in the reverse direction, to apply a fixed tension to the cinefilm 4.

Figure 8:
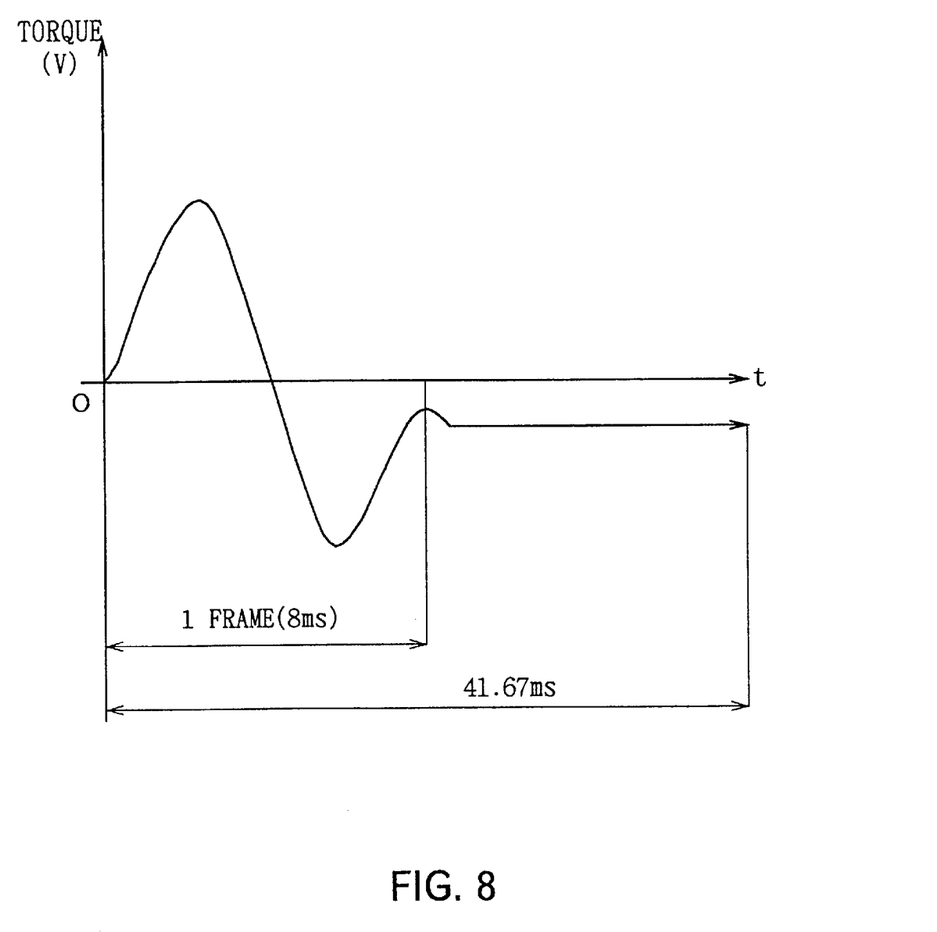
FIG. 8 is a characteristic curvilinear diagram showing a driving waveform in the intermittent feed sprocket for position control and tension control.

Actually, the intermittent drive pulse data D3 has a driving waveform which represents a rotational torque (V) shown in FIG. 8, and it moves the cinefilm 4 by one frame and then applies a torque voltage in the minus direction to move it in a direction reverse to that moving direction.

In this manner, the intermittent film feeder part 11 controls the revolution of the intermittent feed sprockets 18 and 25 via the processing RT1 and RT2 by the control part 56, so as to accurately position the cinefilm 4 to the prescribed position of the film gate part 13 by intermittently feeding the cinefilm 4 for one frame while always applying a fixed tension irrespective of the change of a perforation pitch.

(3) Operation and Effects of the Invention

According to the above structure, the intermittent film feeder part 11 generates intermittent drive pulse data D3 and D4 respectively which are used in order that the control part 56 intermittently feeds the cinefilm 4 frame by frame based on the frame pulse FP supplied from the controller 70, and with those data makes the intermittent feed sprockets 18 and 25 perform the intermittent feed operation.

At this time, the intermittent feed sprocket 25 intermittently feeds the cinefilm 4 for one frame based on the intermittent drive pulse data D4 and then stops the cinefilm 4 at the position. At the same time, the intermittent feed sprocket 18 intermittently feeds the cinefilm 4 for one frame based on the intermittent drive pulse data D3 to such a degree as the cinefilm 4 enters within the range of a prescribed value. Thereafter, a fixed torque which rotates the intermittent feed sprocket 18 in a direction reverse to the intermittent feeding direction is applied to it.

Thereby, in the intermittent film feeder part 11, when the cinefilm 4 is intermittently fed for one frame, a fixed reverse torque is applied to the intermittent feed sprocket 18 so that a fixed tension can be applied to the cinefilm 4 the perforations of which are engaged with the gear teeth of the intermittent feed sprockets 18 and 25.

Accordingly, since the intermittent film feeder part 11 applies the fixed tension to the cinefilm 4 by the intermittent feed sprocket 18 as well as accurately intermittently feeding the cinefilm 4 for one frame by the intermittent feed sprocket 25, it can accurately position the cinefilm on the predetermined position of the film gate part 13 in a constantly stable state irrespective of the change of the perforation pitch of the cinefilm 4, and at the same time, it can prevent the cinefilm 4 from slacking when the perforation pitch is lengthened.

According to the above structure, since the intermittent film feeder part 11 uses the intermittent feed sprocket 25 only for position control, and uses the intermittent feed sprocket 18 for position control and tension control, a state is kept in which a fixed tension is constantly applied when the cinefilm 4 is intermittently fed frame by frame, and thus, accurate positioning can be performed.

(4) Other Embodiments

In the aforementioned embodiment, in the intermittent film feeder part 11, position control is performed by the intermittent feed sprocket 25 and position control and tension control are performed by the intermittent feed sprocket 18. However, the present invention is not only limited to this but also position control and tension control can be performed by the intermittent feed sprocket 25 and position control can be performed by the intermittent feed sprocket 18. In this case, the intermittent feed sprocket 25 can apply a fixed torque so as to further rotate in an intermittent feeding direction when performing tension control.

In the aforementioned embodiment, the intermittent film feeder part 11 intermittently feeds the cinefilm 4 in a normal feeding direction. However, the present invention is not only limited to this but also the present invention can be applied to the case of intermittently feeding a film in a direction reverse to the normal feeding direction.

In the aforementioned embodiment, the intermittent film feeder part 11 serves as a film positioning system, the intermittent feed sprocket part 46 (or 45) is used as the first feeding means, the intermittent feed sprocket part 45 (or 46) is used as second feeding means, and the control part 56 and the controller 70 are used as control means. However, the present invention is not only limited to this but also other various first feeding means, the second feeding means and control means can be used.

In the aforementioned embodiment, the AC servomotors 64 and 66 are used to rotationally drive the intermittent feed sprockets 18 and 25. However, the present invention is not only limited to this but also other various drive means can be used, provided that it can rotationally drive at high speed and with high accuracy such as a DC motor.

Moreover, in the aforementioned embodiment, the present invention is applied to a telecine device. However, the present invention is not only limited to this but also the present invention can be applied to other various intermittent film feeders for intermittently feeding a film-shaped recording medium, such as a projector.

According to the present invention as described above, when a film is fed to a stop position by driving first feeding means and second feeding means synchronizing with each other and then the stop position is decided by either the first feeding means or the second feeding means, a fixed tension is applied to the film by the other feeding means. Thereby, a fixed tension can be applied to a film with a simple configuration in film positioning, so that the film is accurately positioned at the stop position. Thus, a film positioning system and a method thereof in which film positioning can be stably executed can be accomplished.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A film positioning system for feeding a film in a forward direction and then stopping it at a predetermined stop position, comprising:

first feeding means engaged with said film on a supplied side, for pulling the above film in said forward direction by a prescribed distance to send said film to said stop position;

second feeding means engaged with said film on a supplying side to the forward direction of said film, for feeding said film in said forward direction by the prescribed distance and synchronizing with said first feeding means to send said film to said stop positions; and control means for making said first feeding means or said second feeding means hold said film at said stop position when said film is stopped at said stop position, and for making the other of said first feeding means or said second feeding means apply a fixed tension to said film when said one of the first feeding means or the second feeding means holds said film at said stop position;

wherein:

said fixed tension is applied to said film by said control means by commanding a reverse direction force on said film by the other of said first feeding means or said second feeding means;

said first feeding means and second feeding means are controlled by said control means when feeding said film in a forward direction;

said control means controls said first feeding means and said second feeding means in said forward direction by, recognizing a current position of said film, generating a driving pulse that signals movement of said film by said control means, calculating a control value that accounts for error in the current position of said film compared to a target position of said film, driving said film according to the driving pulse and said control value, and repeating said steps of recognizing, generating, calculating, and driving until a new target position is reached; and said control value comprises a calculation including a derivative and integral of a difference "e" between a present position of said film and the target position of said film.

2. The film positioning system according to claim 1, wherein:

said control means stepwise supplies a drive signal to said first feeding means and said second feeding means, respectively in turn, to drive the above first feeding means and the above second feeding means.

3. A film positioning system for feeding a film in a forward direction and then stopping it at a predetermined stop position, comprising:

first feeding means engaged with said film on a supplied side, for pulling the above film in said forward direction by a prescribed distance to send said film to said stop position;

second feeding means engaged with said film on a supplying side to the forward direction of said film, for feeding said film in said forward direction by the prescribed distance and synchronizing with said first feeding means to send said film to said stop position; and control means for making said first feeding means or said second feeding means hold said film at said stop position when said film is stopped at said stop position, and for making the other of said first feeding means or said second feeding means apply a fixed tension to said film when said one of the first feeding means or the second feeding means holds said film at said stop position;

wherein:

said fixed tension is applied to said film by said control means by commanding a reverse direction force on said film by the other of said first feeding means or said second feeding means;

said first feeding means and said second feeding means are controlled by said control means when feeding said film in a forward direction;

said control means controls said first feeding means and said second feeding means in said forward direction by, recognizing a current position of said film, generating a driving pulse that signals movement of said film by said control means, calculating a control value that accounts for error in the current position of said film compared to a target position of said film, driving said film according to the driving pulse and said control value, and repeating said steps of recognizing, generating, calculating, and driving until a new target position is reached;

said new target position is reached when a predetermined number of driving pulses have been output; and said calculation comprises, $$(K_1 \times e) + (K_2 \times d/dt(e)) + (K_3 \times \phi(e)),$$

where $K_1$, $K_2$, and $K_3$ are constants.

4. A film positioning system for feeding a film in a forward direction and then stopping it at a predetermined stop position, comprising:

first feeding means engaged with said film on a supplied side, for pulling the above film in said forward direction by a prescribed distance to send said film to said stop position;

second feeding means engaged with said film on a supplying side to the forward direction of said film, for feeding said film in said forward direction by the prescribed distance and synchronizing with said first feeding means to send said film to said stop position; and control means for making said first feeding means or said second feeding means hold said film at said stop position when said film is stopped at said stop position, and for making the other of said first feeding means or said second feeding means apply a fixed tension to said film when said one of the first feeding means or the second feeding means holds said film at said stop position;

wherein:

said fixed tension is applied to said film by said control means by commanding a reverse direction force on said film by the other of said first feeding means or said second feeding means;

said control means adjusts a response characteristic of said first feeding means and said second feeding means that are driven according to a drive signal, based on an error between a target position represented by said drive signal and drive positions of said first feeding means and said second feeding means when they are driven according to said drive signal; and said response characteristic is adjusted by a difference, represented by "e," between a target position and a present position of said film, and said adjustment comprises an amount represented by, $$D4 = (K_1 \times e) + (K_2 \times d/dt(e)) + (K_3 \times \phi(e)),$$

where $K_1$, $K_2$, and $K_3$ are constants.

5. A method of positioning a film in a cinema device, comprising the steps of:

driving a first feeding means engaged with said film in a forward direction to a stop position;

driving a second feeding means synchronously with said first feeding means in said forward direction;

holding said film by said first feeding means at said stop position; and applying a torque in a reverse direction by said second feeding means while said first feeding means is held in said stop position so that said film is held firmly at a film gate of the cinema device;

wherein:

said steps of driving a first feeding means and driving a second feeding means are controlled by a control device that sends stepwise drive signals to said first and second feeding means by performing the steps of, recognizing a current position of said film, generating a driving pulse that signals movement of said first and second feeding means, calculating a control value that accounts for error in the current position of said film compared to a target position of said film, sending a drive signal, comprising said driving pulse and said control value, to said feeding means to drive said film in said forward direction, and repeating said steps of recognizing, generating, calculating, and sending for a predetermined number of drive pulses calculated to place said film at said stop position;

said control value D4 is calculated by an error "e" between a current position of said film and a target position of said film via the formula, $$D4=(K_1 \times e)+(K_2 \times d/dt(e))+(K_3 \times \phi(e)),$$

where $K_1$, $K_2$, and $K_3$ are constants; and said control value is added to said driving pulse to create said drive signal.

6. The method according to claim 5, wherein said control device further performs the step of varying an amount of said drive signal so the film is intermittently driven smoothly by each drive pulse.

7. The method according to claim 5, further comprising the steps of:

after said driving steps and before said holding and applying steps, calculating a second error in a current position of said film compared to the target position of said film;

if said second error is not within a predetermined range, calculating a second control value that accounts for error in the current position of said film compared to a target position of said film, applying said second control value to said first and second feeding means; and repeating said steps of calculating a second error, calculating a second control value, and applying said second control value until said second error is within said predetermined range.

8. The method according to claim 7, wherein said second control value D3 comprises:

$$D3=(Q_1 \times E)+(Q_2 \times d/dt(E))+(Q_3 \times \phi(E)),$$

where $Q_1$, $Q_2$, and $Q_3$ are constants, and E represents said second error.

9. The method according to claim 8, wherein said method is applied in a telecine device having a CCD camera that converts images on said film, said film being a cinefilm, into a video signal.

10. A method of positioning a film in a cinema device, comprising the steps of:

driving a first feeding means engaged with said film in a forward direction to a stop position;

driving a second feeding means synchronously with said first feeding means in said forward direction;

holding said film by said first feeding means at said stop position; and applying a torque in a reverse direction by said second feeding means while said first feeding means is held in said stop position so that said film is held firmly at a film gate of the cinema device;

further comprising the steps of:

after said driving steps and before said holding and applying steps, calculating an error in position of a current position of said film compared to the target position of said film, if said error is less than a prescribed value, calculating a control value that accounts for error in the current position of said film compared to a target position of said film and applying said control value to said first and second feeding means.

11. In a film positioning system having feeding means for feeding a film, a control mechanism for positioning the film at a stop position, comprising:

a film position recognition device configured to determine a current position of the film;

a control value calculator configured to calculate a control value that includes an amount of error represented by a difference "e" between the current position of the film and said stop position; and a control device configured to drive said feeding means to position the film at said stop position based on the calculated control value;

wherein the control value calculation includes a derivative and integral of the difference "e."

12. The control mechanism according to claim 11, wherein said calculation comprises:

$$(K_1 \times e)+(K_2 \times d/dt(e))+(K_3 \times \phi(e)),$$

where $K_1$, $K_2$, and $K_3$ are constants.

13. The control mechanism according to claim 11, wherein:

said feeding means comprises first feeding means and second feeding means; and positioning of the film is performed by feeding the film in a forward direction and then stopping it at said stop position, said positioning comprising the steps of, pulling said film, on a supplied side with respect to the forward direction of said film, in said forward direction by a prescribed distance with said first feeding means engaged with said film, and feeding said film, on a supplying side with respect to the forward direction of said film, in said forward direction by the prescribed distance synchronously with said first feeding means with said second feeding means engaged with said film, to send said film to said stop position; and making said first feeding means or said second feeding means hold said film at said stop position when said film is stopped at said stop position, and making the other of said first feeding means or said second feeding means apply a fixed tension to said film by applying a fixed torque in a reverse direction when said one of the first feeding means or the second feeding means holds said film at said stop position.

14. The control mechanism according to claim 13, wherein said positioning further comprises the step of:

supplying a drive signal stepwise to said first feeding means and said second feeding means respectively in turn, so that the first feeding means and the second feeding means are driven.

15. The control mechanism according to claim 13, wherein said positioning further comprises the steps of:

adjusting a response characteristic of said first feeding means and said second feeding means, that are driven according to a drive signal, based on an error between a target position represented by said drive signal and drive positions of said first feeding means and said second feeding means when they are driven according to said drive signal.

* * * * *